A. B. ANDERSON AND R. L. WOOD.
FRAME FOR LICENSE NUMBER PLATES.
APPLICATION FILED NOV. 2, 1921.

1,411,257.

Patented Apr. 4, 1922.

Alexander B. Anderson
Raymond L. Wood
INVENTORS

BY J. M. Thomas
ATTORNEY

UNITED STATES PATENT OFFICE.

ALEXANDER B. ANDERSON AND RAYMOND L. WOOD, OF SALT LAKE CITY, UTAH.

FRAME FOR LICENSE-NUMBER PLATES.

1,411,257. Specification of Letters Patent. Patented Apr. 4, 1922.

Application filed November 2, 1921. Serial No. 512,203.

*To all whom it may concern:*

Be it known that we, ALEXANDER B. ANDERSON and RAYMOND L. WOOD, citizens of the United States, residing at Salt Lake City, in the county of Salt Lake and State of Utah, have invented certain new and useful Improvements in Frames for License-Number Plates, of which the following is a specification.

Our invention relates to means to fasten and display license numbers on road vehicles, and has for its object to provide a convenient, economical and attractive frame for fastening the license number on vehicles such as automobiles, trucks, motorcycles, wagons and other vehicles.

These objects we accomplish with the device illustrated in the accompanying drawings in which similar letters of reference indicate like parts throughout the several views, and as described in the specification forming a part of this application, and pointed out in the appended claims.

Figure 1:
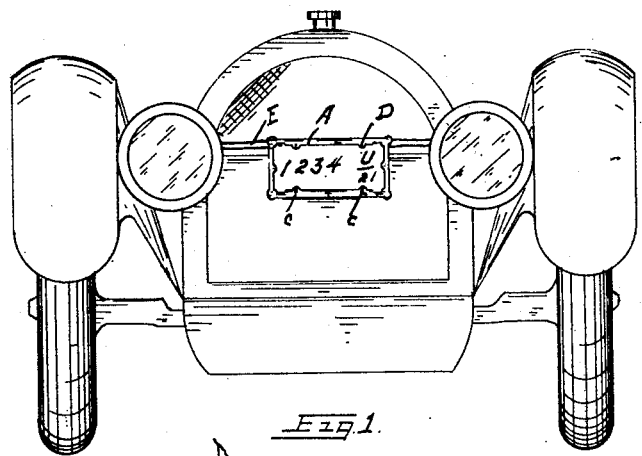
Figure 2:
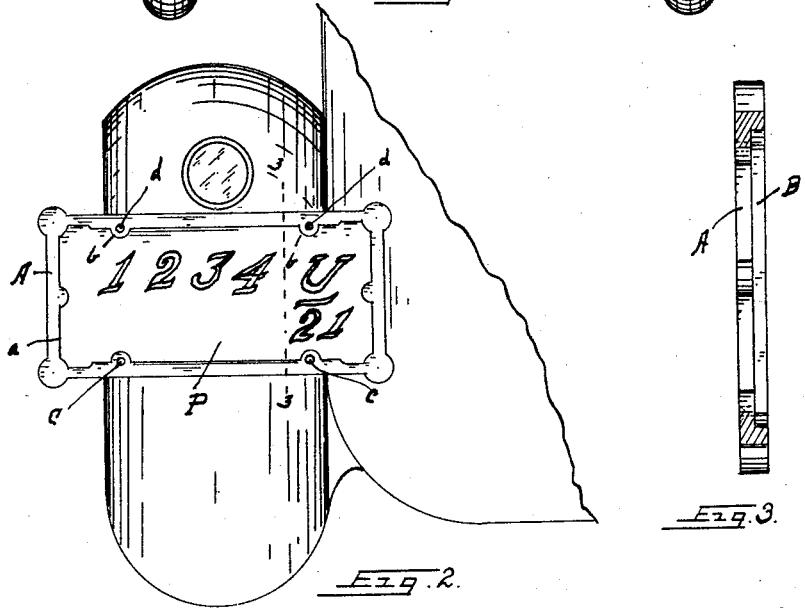
Figure 3:
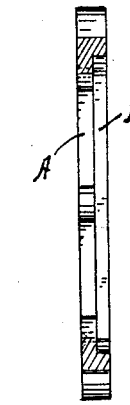

In the drawings in which we have shown a substantial embodiment of our invention, Figure 1 is a view of the front end of an automobile with our device in place thereon, and showing a license number secured on the automobile, as required in some States. Figure 2 is an elevation of our device as used on the rear end of an automobile, as required in other places or States. Figure 3 is a transverse section of the device, on line 3—3 of Figure 2.

The present invention is to provide a frame within which the metal license plate may be carried, and attractively displayed, and by which the said license number may be secured on the vehicle, and easily removed for cleaning, or renewing for other years, and in such distinctive and attractive manner as will be readily noticed and easily read. The frame A is made of any suitable material, preferably metal which will not tarnish, or which is painted, and which frame has a sight opening *a* large enough to display the license number and other indices required. A portion of the back of the frame is cut out or so formed in construction as to provide a recess, B, conforming in length and width with the license plate, P, to be carried in said recess, as a picture is carried in a frame, by the recess B being longer and wider than the sight opening *a*. As additional holding means the inner edges of said frame A have integral lugs *b* extending a short distance over the face side of the number plate or license plate P. Some of said lugs are transversely bored, with countersunk holes *c*, to receive the short bolts D, similar to stove bolts, which are passed through the said holes *c* of the frame and through alined holes bored in the edge portion of said license or number plate P, and on some automobiles through the flat bar E of the automobile, with nuts screwed on said bolts D. We thus secure and fasten the license or number plate P in the frame A, and both on the rear end of the automobile where the numbers may be easily read. Other shorter but similar bolts are used in the opening *d* to fasten the license number plate in the frame A, and on some vehicles both edges of the frame may be secured by the bolts D.

We thus provide a new and useful frame to protect the license number plate and in which said plate may be displayed in a distinctive manner, and may be quickly taken out for cleaning the plate or to hold another plate in its place, having the successive numbers thereon.

Having described our invention, we desire to secure by Letters Patent and claim:

1. In a device of the class described the combination of a rectangular frame having extended rounded corners and a sight opening of general rectangular shape but smaller than the outline of the frame and with portions of the front face of said frame extending within said sight opening and given a curved form similar to the rounded corners of said frame; perforated lugs integral with the edge of the frame also extending into said sight opening; a portion of the rear face of said frame cut away to form a plate receiving recess; and bolts passed through the perforations in said lugs to fasten a number plate in said recess and said frame on an automobile.

2. In a device of the class described the combination with a rectangular frame having extended rounded corners and a sight opening of general rectangular shape but smaller than the outline of the frame; of portions of the front face of said frame extending within said sight opening and given a semi-circular form similar to the rounded corners of said frame; perforated semi-circular lugs integral with the front face and edge of said frame and also extending into said sight opening; a portion of the rear face of said frame cut away to form a plate receiving recess; and bolts passed through the perforations in said lugs to fasten a license number plate in said recess and said frame on an automobile.

In testimony whereof we have affixed our signatures.

ALEXANDER B. ANDERSON.
RAYMOND L. WOOD.